Nov. 28, 1944. O. F. SOETBEER 2,363,700
OPTICAL SURFACE EXAMINING APPARATUS
Filed March 19, 1942 5 Sheets-Sheet 4
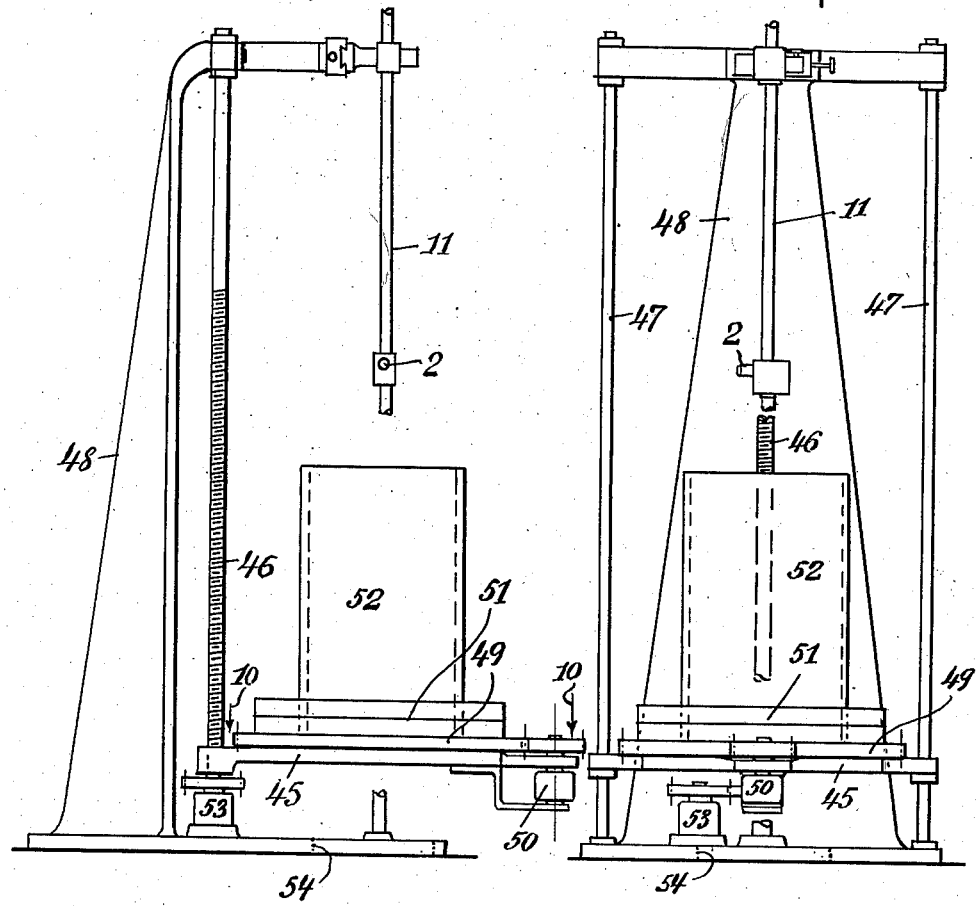
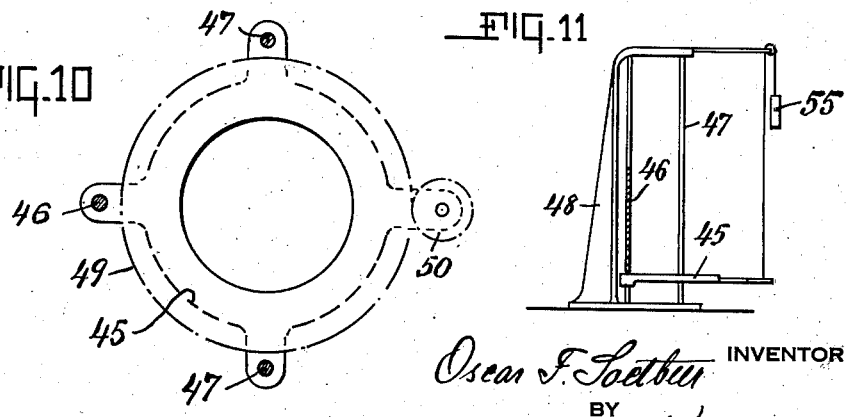

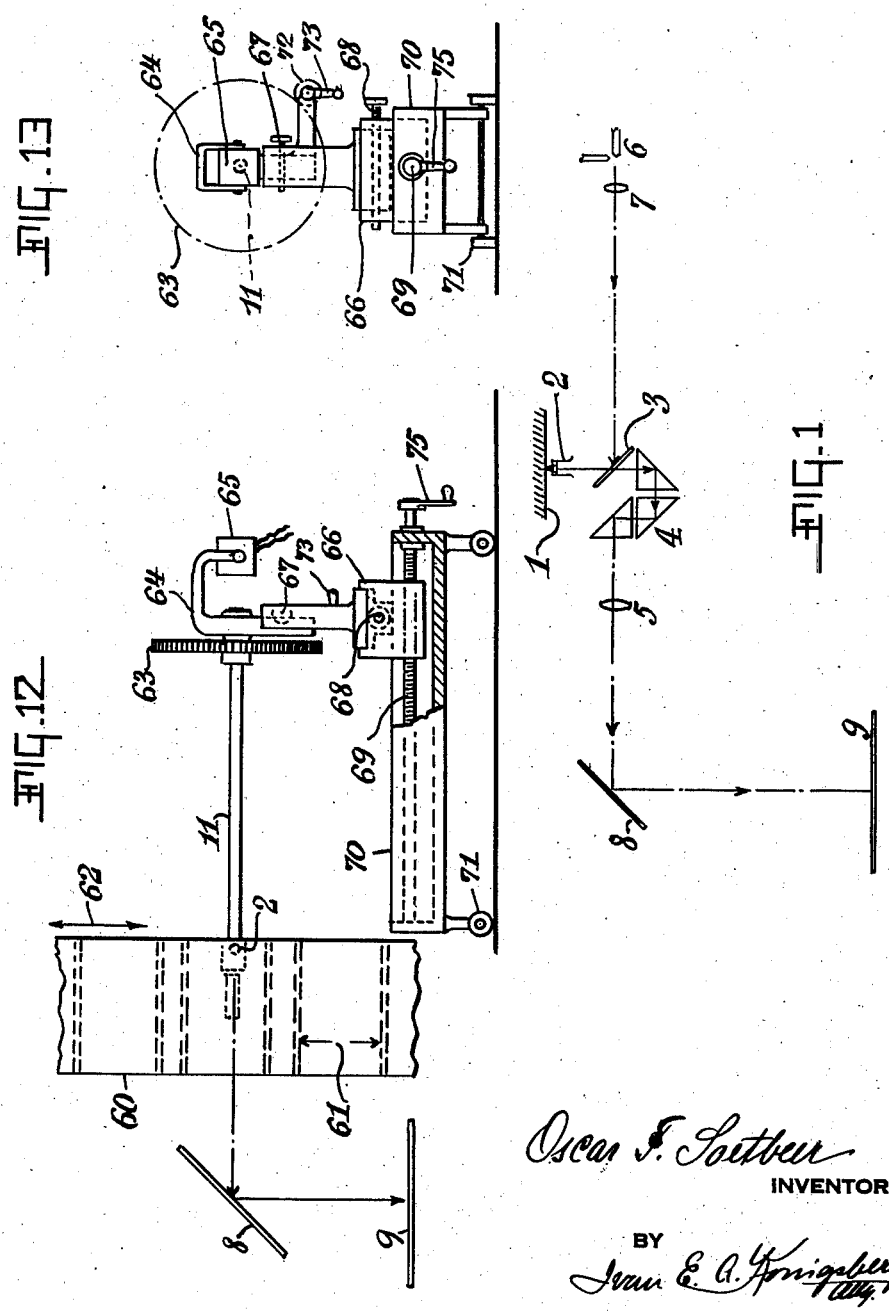

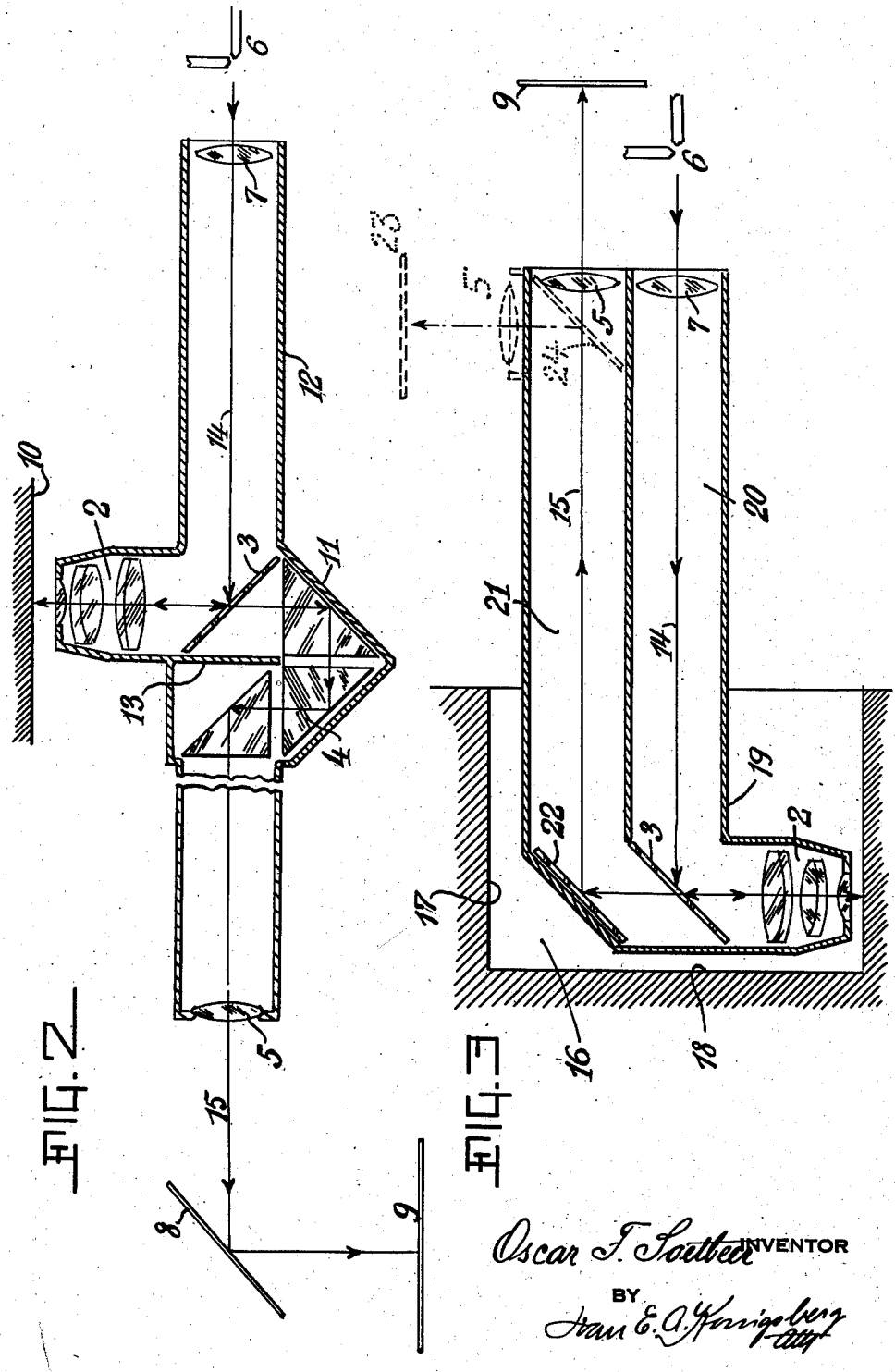

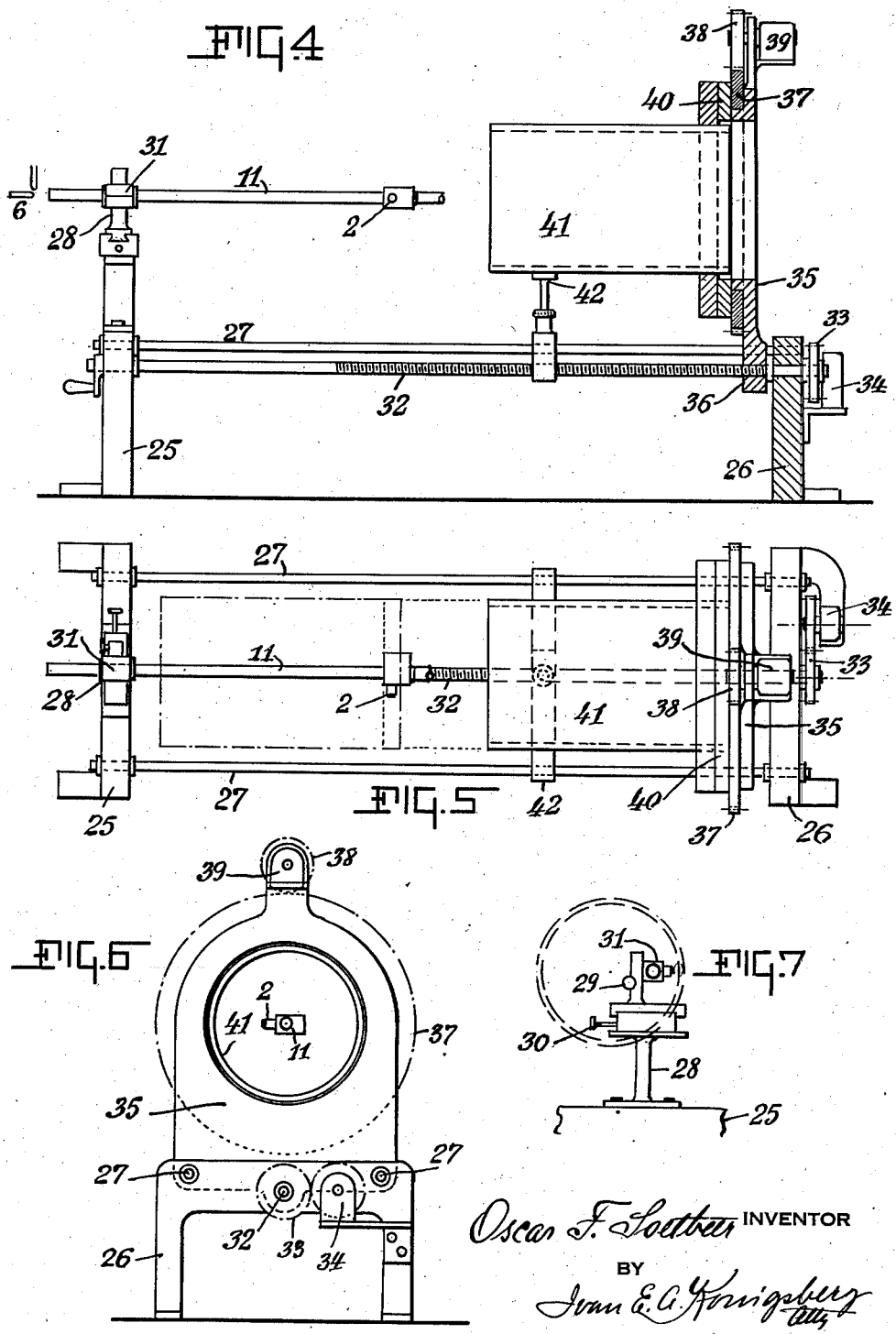

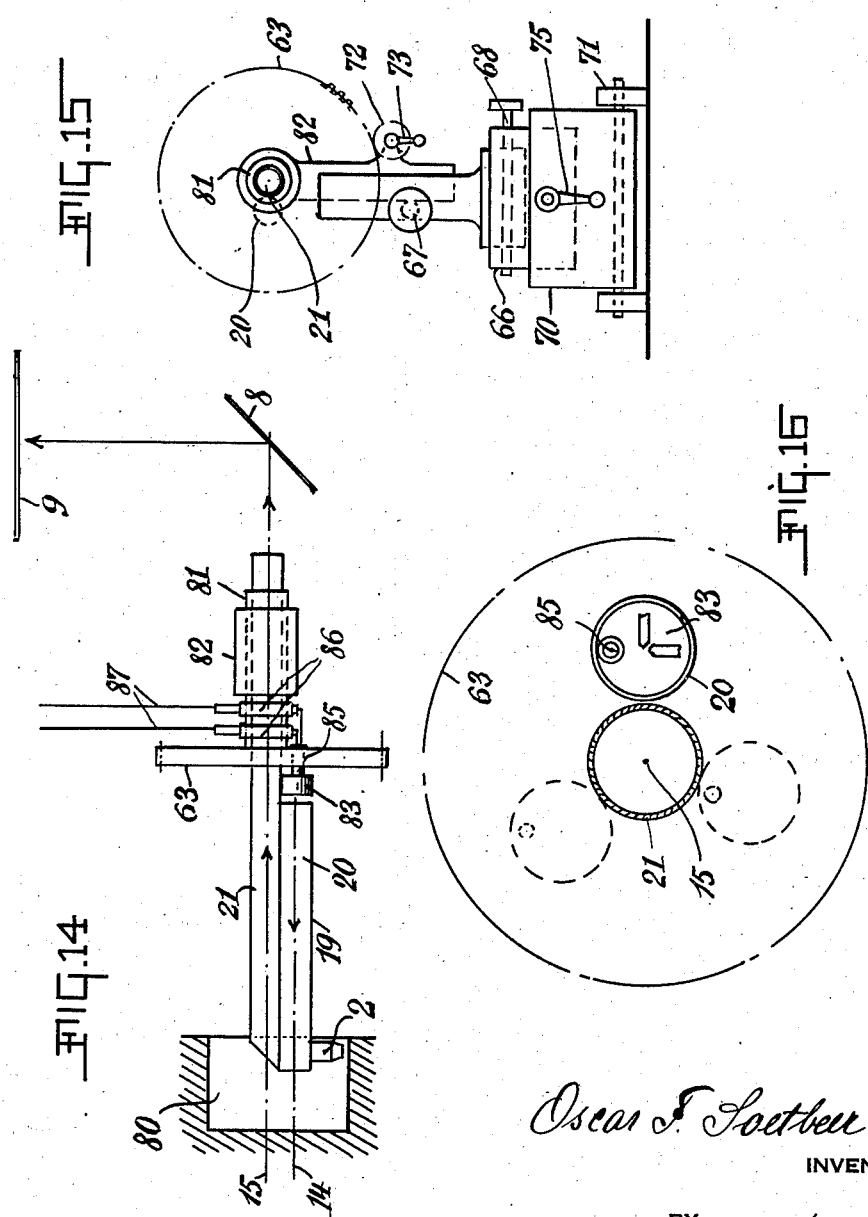

Patented Nov. 28, 1944

2,363,700

UNITED STATES PATENT OFFICE 2,363,700

OPTICAL SURFACE EXAMINING APPARATUS

Oscar F. Soetbeer, Massapequa Park, N. Y.

Application March 19, 1942, Serial No. 435,284

8 Claims. (Cl. 88—24)

The object of this invention is to provide an apparatus for carrying out illuminated microscopic inspection of the interior walls of engine cylinders, bearings and other objects having surfaces not accessible for microscopic surface inspection by ordinary or standard microscopic apparatus. Particularly it is an object of the invention to provide an apparatus whereby engine or motor cylinders may be inspected as to surface conditions of the interior walls and a magnified image of the surface projected upon a screen for visual examination.

Microscopic surface inspection is known and usually practised by placing the object or a prepared sample thereof under a microscope. This method cannot be used for the inspection of surfaces of objects of the type under consideration. Another object of the invention is to provide an optical inspection apparatus for the purpose described which shall be easily moved about so as to be brought into operative relation to the work to be inspected and which is also so arranged that both open ended tubular objects as well as such which have one end closed may be examined. Other objects will appear as this specification proceeds.

The invention is embodied in an apparatus comprising an optical system for inspecting a surface which latter is illuminated so that a magnified microscopic image of the inspected surface may be projected upon a screen. The apparatus includes suitable supporting means whereby the optical system may be moved into operative relation to the work or the latter may be moved with relation to the system as the nature of the work may dictate. The apparatus also provides means for inspecting open ended objects in which case the observation axis passes through the object. If one end of the object is closed the apparatus provides means for directing the observation axis away from that end in the opposite direction. In all forms of the invention the apparatus includes the optical system, means for illuminating the surface to be inspected, means for projecting a magnified image of the surface upon a screen and the necessary mechanical supporting means, focusing means and driving mechanism. In the accompanying drawings illustrating the invention.

Fig. 1 is a diagram of the optical system.

Fig. 2 is a sectional view of an optical illuminator to be used for the inspection of the interior walls of open ended tubular objects.

Fig. 3 is a similar view of an illuminator to be used when one end of the interior is closed.

Fig. 4 is a side view with parts removed of a horizontally arranged apparatus embodying the invention.

Fig. 5 is a plan view thereof.

Fig. 6 is an end view looking from the right in Fig. 5.

Fig. 7 is a detail view of focusing means for the illuminator.

Fig. 8 is a side view of a vertically arranged apparatus.

Fig. 9 is a front view of Fig. 8.

Fig. 10 is a sectional plan view with parts omitted and taken on the line 10—10 of Fig. 8.

Fig. 11 is an outline view of the apparatus in Fig. 8 showing additional counterbalancing means.

Fig. 12 is a side view partly in section and partly broken away of an apparatus for inspecting the surfaces in a block of cylinders.

Fig. 13 is an end view of Fig. 12.

Fig. 14 is a plan view in outline of an apparatus to be used for inspecting cylinders having one end closed, some parts being omitted.

Fig. 15 is an end view of the apparatus in Fig. 14.

Fig. 16 is a diagram showing the lamp in relation to the observation tube in the apparatus according to Figs. 14 and 15.

The optical microscopic inspection of a surface is in this invention carried out by means of an optical microscope system including certain lenses and prisms, all of which hereinafter is called an illuminator as a matter of convenience. Fig. 1 illustrates diagrammatically the illuminator optical system. In this figure the reference numeral 1 denotes a surface to be inspected. The illuminator comprises an objective 2, a reflecting plate 3, a system of prisms designated as a whole by the number 4 and a microscope lens system indicated by the ocular lens 5. At 6 a source of light, usually an arc lamp, is shown in front of which a condenser lens 7 is suitably supported. A mirror 8 reflects the image forming rays upon a screen 9. The light rays from the lamp 6 are made to fall upon the reflecting plate 3 and when so reflected pass through to the objective 2 and fall upon the surface 1 where they illuminate a circular spot. According to the nature of the surface 1 a greater or lesser portion of the rays which impinge upon said surface passes by reflection or diffraction back through the objective and through the plate 3 to the prisms 4 which, as shown, by total reflection forward the rays to the reflecting mirror 8 and the latter reflects the rays upon the screen 9 where the image is formed and may be examined to ascertain the condition of the surface 1.

An illuminator to be used for inspecting the interior walls of an open ended object is shown diagrammatically in Fig. 2. In this view the surface to be inspected is marked 10. The optical system is mounted in a suitable tubular housing 11 forming a light tube 12 and a partition 13. The other optical elements bear the same reference numbers as are used for the same parts in Fig. 1. As is shown by lines and arrows, the light rays from the lamp 6 pass through the light tube 12 to the plate 3, thence to the objective 2 and to the work 10. Then back through the objective to the prisms 4 and the ocular lens 5, the reflecting mirror 8 and to the screen 9. The microscope is indicated by the objective and the ocular lens as being a sufficient illustration, microscope lens systems being known. The partition 13 prevents the light rays from passing straight through the illuminator. In this form of illuminator the light axis 14 and the observation axis 15 are co-axial.

The illuminator in Fig. 3 is for use when the object is of such a nature that the optical axis of the instrument, i. e., the axes 14—15, cannot pass straight through the object as in Fig. 2. Thus in Fig. 3 the numeral 16 indicates an object having an interior cylindrical wall 17 and a closed end wall 18. In this case the illuminator comprises a housing 19 forming a light tube 20 and a microscope tube 21 in parallel relation. The light rays from the lamp 6 pass as before described to the reflecting plate 3, the objective 2, back through the plate 3 to a reflecting mirror 22 and to the ocular lens 5. Then either directly to the screen 9 or sideways to a screen 23 by way of a reflector 24. This alternative form is shown in dotted lines.

Referring now to Figures 4-7 the apparatus is supported on two end frames 25 and 26 secured together by tie rods 27 and other like means, not shown. Upon the frame 25 there is mounted a microscope stand 28 having the usual vertical and horizontal focusing means indicated at 29 and 30 respectively. The stand supports a holder 31 for supporting the illuminator which is designated by the tube 12, Fig. 2. The frames 25 and 26 support a screw shaft 32 which is either hand operated or motor driven. As shown the shaft is geared at 33 to an electric motor 34. The shaft is rotated to move a carrier 35 horizontally towards and away from the illuminator. For this purpose the carrier has a threaded bearing 36 which engages the shaft and the carrier is supported upon and slides upon the tie rods 27, Fig. 6. A gear 37 is rotatably supported upon the carrier and is driven by a pinion 38 from another electric motor 39 mounted upon the carrier. To the gear 37 there is secured a self centering chuck of any known construction, not shown in detail. The chuck 40 is adapted to support the cylinder 41 to be inspected. If necessary the work may be additionally supported by a saddle 42 which is also driven by the screw shaft and which slides upon the tie rods.

In Figure 4 the work 41 has been placed in the chuck. Then by starting the motor 34 the work is moved up to the illuminator and the latter is focused like a microscope to bring the objective 2 in focus with the spot upon the cylinder surface which has been selected for inspection. Then by alternate operation of the two motors the work or cylinder is moved axially of the illuminator and rotated about the same for inspection of as many portions of the cylinder walls as may be desired. It is understood of course that a lamp will be placed in the proper position to supply light to the illuminator, also that a reflector 8 and screen 9 will be used. These elements are parts of the apparatus, see Fig. 1. The focusing of the objective is checked for each spot to be inspected. When the operation is finished the motor 34 is reversed. The work is moved away from the illuminator, the chuck opened and then the apparatus is ready for the next object to be inspected.

If for any reason it should be deemed desirable to carry out the operation in a vertical direction instead of horizontally as in Fig. 4, an apparatus as outlined in Figs. 8-11 may be used. In these views the carrier 45 is mounted to be moved vertically by a screw shaft 46 while it slides on tie rods 47, a suitable supporting stand 48 being provided. The illuminator 11 is mounted at the top of the stand and is focused as described above. The carrier supports a gear 49 to be rotated by a motor 50 to rotate a chuck 51 upon the gear. Another motor 53 drives the screw shaft. In this form of the apparatus the work is moved vertically towards and away from the illuminator, the operation being carried out as described under Fig. 1.

It will be noted that in Fig. 4 and in Fig. 8 there is a clear opening through the apparatus for passage of the observation axis from the illuminator to the screen. In Fig. 8 the stand 48 has an opening 54 in the foot for this purpose, it being supposed that the apparatus will be elevated to permit the reflecting mirror, not shown, to be so positioned that the image forming rays may be reflected towards the screen as will be understood. Fig. 11 outlines a counterbalancing device at 55 to counterbalance the weight of the carrier and the work if such should be necessary.

Figs. 12 and 13 illustrate a surface inspection apparatus in which the illuminator is moved along the surface because of the nature of the object. The work, by way of example, is shown as being a block 60 with cylinders 61. It is further supposed that the work is suspended for vertical movement so as to place the cylinders successively in alinement with the illuminator. This is indicated at 62. The illuminator 11 is in this type of apparatus supported to travel in a direction parallel to the observation axis and to be rotated to follow the surface to be inspected. In Figs. 12 and 13 the illuminator 11 is mounted centrally on a gear 63 which in turn is rotatably carried by a bracket 64. The latter also supports a lamp 65 in optical alinement with the illuminator. The latter passes of course clear through the gear so as to receive light from the lamp. The objective 2 in the bracket 64 is focusably mounted upon a carrier 66, the vertical and horizontal focusing means being indicated at 67 and 68 respectively. The carrier 66 is in driving engagement with a screw shaft 69 supported in a base 70 which also serves to guide the carrier as shown in Fig. 13. The base 70 may have wheels 71 so as to be moved towards the work. The gear 63 is driven by a pinion 72 rotated by a hand crank 73 upon the bracket 64. The screw shaft is rotated by a hand crank 75. In use, this type of apparatus is moved into operating position with relation to the work. The illuminator is focused on the cylinder walls. Then by alternately operating the hand cranks the objective is moved longitudinally and circumferentially within the cylinder 61. The lamp is supported in a fixed position with relation to the illuminator and remains so during the operation.

Figs. 14-16 illustrate an apparatus to be used for inspecting a cylinder having a closed end. For such inspection the illuminator 19 in Fig. 3 will be used. The illuminator 19 is mounted in a manner similar to that shown in Fig. 12 and is similarly operated. Parts in Figs. 14 and 15 which perform the same functions as like parts in Fig. 12 bear the same reference numbers. It is assumed that the closed cylinder 80 in Fig. 14 is not rotatable nor slidably operable. The illuminator 19 is supported in a hub 81 which is rotatably mounted in an adjustable bracket 82 so as to be focused as shown. The hub 81 carries the gear 63 so it can be rotated and rotate the illuminator about the observation axis 15 and the microscope tube 21, Fig. 3. Because of this rotation the lamp 83 cannot be fixedly mounted. Instead the lamp is suspended by gravity from a pivot 85 in the gear 63 and receives the electric current from rotating contact rings 86 on the hub 81 as shown, the supply wires being shown at 87. The operation is as described under Fig. 12. As the gear 63 is rotated to bring the objective 2 opposite the spot in the cylinder to be inspected, the lamp remains in alined position with the light tube as shown in Fig. 16.

In the several views where the lamp is shown conventionally it will be understood that such lamps are manufactured to be supported on an adjustable support, not shown, so as to be adjusted for the work in hand. Likewise it will be understood that the reflecting mirror 8 will be mounted and supported as is customary in the art, these and other details follow as a matter of course and are not particularly illustrated. The moving parts may be hand driven or motor operated or both driving means may be used as may seem desirable. The invention provides an optical microscopic surface inspection apparatus illuminated to form images to be projected on a screen so that the conditions of the inspected surface may be visually ascertained. The optical system will of course provide the required magnification.

I claim:

1. An apparatus for optically examining the surface of an interior wall in an open ended cylinder comprising an optical magnifying image forming system including an objective positioned at a right angle to the axis of the image forming rays of the system, a housing enclosing said system and having a light admitting opening at one end and an image rays outlet opening at the other end, a mechanism for supporting the said cylinder and for moving it into a selected position enclosing said objective with the said interior cylinder wall in optical operative relation to the objective, means to support said housing including means to focus the said objective with respect to said cylinder wall, means for directing a beam of light through said light admitting opening to the said objective to illuminate the cylinder wall in front of the objective and a projection screen positioned to receive and visualize the magnified image of the surface of the said interior wall formed by the said optical system, said cylinder supporting mechanism having openings for the passage of the image forming rays from the optical system to the said screen.

2. An apparatus according to claim 1 in which the said housing containing the optical system is positioned between the said light directing means and the cylinder to be examined and the latter is positioned between the said housing and the said projection screen, the axis of the said image forming rays being substantially parallel to the axis of the cylinder.

3. An apparatus for optically examining the surface of an interior wall in a hollow object comprising a frame, a focusing stand thereon, a housing supported on said stand, a magnifying image forming optical system within said housing including an objective positioned at a right angle to the axis of the image forming rays of the system, a movable carrier supported on said frame, means on the carrier for supporting the hollow object to be examined, means on the carrier for rotating said object, a screw shaft on said frame in driving engagement with said carrier, a lamp positioned in optical relation to the said system for directing a beam of light through the said objective upon the said wall to be examined, means for rotating said screw shaft to move said carrier to position said hollow object with its said interior wall in optical examining relation to the said objective and a projection screen positioned in optical relation to the said system to receive and visualize the magnified image of the said wall formed by said system, said carrier and object supporting means having openings through which the said image forming rays pass from the said system to the said screen.

4. An apparatus for optically examining the surface of an interior wall in an open ended hollow object comprising a movable base, a movable focusing stand supported on said base, a bracket movably mounted on the said stand, a housing carried by the bracket, an optical magnifying image forming system within said housing including an objective positioned at a right angle to the axis of the image forming rays of the system, a lamp supported on said bracket in optical operative relation to the optical system for directing a beam of light through the said housing and through the said objective to illuminate the interior wall to be examined, driving means on said base engaging said movable focusing stand to position the optical system within said hollow object in optical surface examining relation to the said wall thereof, means on said bracket for rotating said housing and a projection screen positioned in optical relation to the said system to receive and visualize the magnified image of the wall formed by the system, the said image forming rays passing from the system through the object to the screen.

5. An apparatus for optically examining an interior wall in a hollow object having a closed end as described comprising a base, a movable focusing stand mounted thereon, a bracket movably supported on said stand, a housing rotatably carried by the bracket, an optical magnifying image forming system within said housing including an objective positioned at a right angle to the axis of the image forming rays of the system, a gear on said housing for rotating the same and said optical system, means on the bracket to rotate said gear, a lamp supported on said gear in fixed optical relation to the axis of the image forming rays of the optical system for directing a beam of light through said housing and objective to illuminate the said interior wall, means rotating with the said gear for supplying electric current to the said lamp and a projection screen positioned in optical relation to the axis of the optical system for visualizing the magnified image of the wall produced by the system, the said optical system and said lamp being positioned between the said hollow object and the said screen.

6. An apparatus according to claim 5 including means for suspending the said lamp upon the said gear by gravity.

7. An optical surface examining device of the character described comprising a tubular housing, a partition therein dividing said housing into a light directing tube and a microscope tube on opposite sides of the partition, an optical magnifying image forming system supported in said housing including an objective positioned with its axis at a right angle to the axis of the light directing tube on one side of said partition and an ocular in the free end of the microscope tube on the opposite side of said partition, a lamp for directing a beam of light through said light directing tube to the said objective to illuminate a surface to be imaged by said system and a plurality of prisms within said housing for directing the reflected light beam from the said objective around said partition into the microscope tube, the axis of the latter being coaxial with the axis of the said light beam for the purpose described.

8. An optical surface examining device of the character described comprising a longitudinal housing, a partition therein forming a light directing tube and a microscope tube in parallel relation lengthwise of the housing, said tubes each having an open end in the one end of said housing, the latter being closed at the opposite end, an optical magnifying image forming system supported within the housing including an objective positioned with its axis at right angles to the axis of said light directing tube at the inner closed end thereof and an ocular supported in the said open end of said microscope tube, a lamp for directing a beam of light through said light directing tube and object to illuminate a surface to be imaged by said system and an optical element supported in the closed end of the said microscope tube for directing the reflected light beam from the said objective into the microscope tube, the axis of the image forming rays in the latter being parallel to the axis of the said light beam, the said two tubes communicating optically with each other at their closed ends whereby the direction of the said light beam is opposite to the direction of the image forming rays through the said ocular.

OSCAR F. SOETBEER.